(12) United States Patent
Demarest et al.

(10) Patent No.: US 8,070,401 B2
(45) Date of Patent: Dec. 6, 2011

(54) APPARATUS FOR MAKING CENTRIFUGALLY-CAST TUBE

(75) Inventors: Joel Demarest, Pitres (FR); Gilles Verdier, Pitres (FR)

(73) Assignee: Manoir Industries, Inc., Humble, TX (US)

(*) Notice: Subject to any disclaimer, the term of this patent is extended or adjusted under 35 U.S.C. 154(b) by 0 days.

(21) Appl. No.: 12/775,667

(22) Filed: May 7, 2010

(65) Prior Publication Data

US 2010/0215454 A1 Aug. 26, 2010

Related U.S. Application Data

(60) Continuation of application No. 12/404,626, filed on Mar. 16, 2009, now abandoned, which is a continuation of application No. 11/270,512, filed on Nov. 10, 2005, now abandoned, which is a continuation of application No. 10/465,673, filed on Jun. 20, 2003, now abandoned, which is a division of application No. 09/933,475, filed on Jul. 27, 2001, now Pat. No. 6,644,358.

(51) Int. Cl.
*B23D 37/04* (2006.01)
*B23D 37/22* (2006.01)
*B23D 43/04* (2006.01)

(52) U.S. Cl. ........ 409/259; 409/249; 409/253; 409/260; 409/287; 407/15; 407/18

(58) Field of Classification Search .......... 409/259–261, 409/249, 287, 286, 276, 277, 250, 253; 407/12, 407/13, 15, 18
See application file for complete search history.

(56) References Cited

U.S. PATENT DOCUMENTS 2,210,848 A * 8/1940 Bohle ............................ 407/18
(Continued)

FOREIGN PATENT DOCUMENTS
DE 1752709 A1 * 7/1971
(Continued)

OTHER PUBLICATIONS

Olar et al., *Elecktronnaya Obrabotka Materialov*, 5:pp. 9-13 (1988).

(Continued)

*Primary Examiner* — Erica E Cadugan
(74) *Attorney, Agent, or Firm* — Leydig, Voit & Mayer, Ltd.

(57) ABSTRACT

An improved centrifugally-cast tube is provided, along with a related method and apparatus of making the tube. The tube includes a plurality of grooves and bosses that are mechanically machined into an interior surface of the tube, such as by a broaching process. The profile of grooves and bosses may be defined by a plurality of intersecting concave and convex radii. The tube is resistant to creep, carburization and metal dusting. The tube also has an enhanced heat transfer rate, and a desirable surface roughness. A method of making the tube is also provided. The method essentially consists of mechanically deforming the interior surface of the tube by passing a series of cutting inserts on support rings having incrementally-differing dimensions over the interior surface. An apparatus is also provided which includes a telescoping shaft upon which is mounted at least one cutting tool that has a plurality of cutting inserts and is adapted to form a plurality of grooves and bosses in the interior surface of the tube. The grooves and bosses may be straight or spiraled.

18 Claims, 6 Drawing Sheets

U.S. PATENT DOCUMENTS

| | | | |
|---|---|---|---|
| 2,315,476 A | * | 3/1943 | Groene .................. 409/261 |
| 2,547,509 A | | 4/1951 | Tozer |
| 2,864,591 A | | 12/1958 | Frink |
| 2,978,797 A | | 4/1961 | Ekelund |
| 3,088,494 A | | 5/1963 | Koch et al. |
| 3,267,564 A | | 8/1966 | Keyes |
| 3,274,978 A | | 9/1966 | Palchik |
| 3,600,922 A | | 8/1971 | Schmeling |
| 3,627,516 A | | 12/1971 | Bellot et al. |
| 3,692,429 A | | 9/1972 | Redding |
| 3,769,194 A | | 10/1973 | Haggerty |
| 3,776,018 A | | 12/1973 | French |
| 3,875,997 A | | 4/1975 | Newson |
| 3,946,472 A | | 3/1976 | Proulx et al. |
| 3,954,421 A | | 5/1976 | Heuschkel |
| 4,012,829 A | | 3/1977 | Dvorov et al. |
| 4,026,779 A | | 5/1977 | Shaw |
| 4,154,296 A | | 5/1979 | Fijas |
| 4,216,575 A | | 8/1980 | Carnavos |
| 4,248,179 A | | 2/1981 | Bonner |
| 4,274,766 A | | 6/1981 | Raupp et al. |
| 4,277,207 A | | 7/1981 | Proulx |
| 4,342,642 A | | 8/1982 | Bauer |
| 4,411,569 A | | 10/1983 | Pizzola |
| 4,444,589 A | | 4/1984 | Sugitani et al. |
| 4,657,074 A | | 4/1987 | Tomita |
| 4,690,737 A | | 9/1987 | Vishnitsky |
| 4,729,155 A | | 3/1988 | Cunningham |
| 4,827,074 A | | 5/1989 | Suwa |
| 4,985,609 A | * | 1/1991 | Hofele .................. 219/69.17 |
| 5,004,529 A | | 4/1991 | Vishnitsky |
| 5,152,646 A | | 10/1992 | Bauer |
| 5,271,809 A | | 12/1993 | Holzhausen |
| 5,352,068 A | | 10/1994 | Roseliep |
| 5,388,329 A | | 2/1995 | Randlett |
| 5,409,675 A | | 4/1995 | Narayanan |
| 5,503,506 A | | 4/1996 | Yuan |
| 5,628,589 A | * | 5/1997 | Peuterbaugh .................. 407/15 |
| 5,655,599 A | | 8/1997 | Kasprzyk |
| 5,803,165 A | | 9/1998 | Shikazono |
| 5,820,320 A | | 10/1998 | Kobari et al. |
| 6,217,456 B1 | | 4/2001 | Jacob |
| 6,250,340 B1 | | 6/2001 | Jones et al. |
| 6,558,086 B1 | * | 5/2003 | Rigotti et al. .................. 407/15 |
| 6,644,358 B2 | | 11/2003 | Demarest et al. |
| 7,520,705 B2 | * | 4/2009 | Degesne .................. 409/259 |
| 2003/0019533 A1 | | 1/2003 | Demarest et al. |
| 2003/0209126 A1 | | 11/2003 | Demarest et al. |
| 2004/0079216 A1 | | 4/2004 | Demarest et al. |
| 2006/0056934 A1 | | 3/2006 | Demarest et al. |
| 2006/0062646 A1 | | 3/2006 | Demarest et al. |
| 2007/0178328 A1 | | 8/2007 | Demarest et al. |
| 2009/0158807 A1 | | 6/2009 | Demarest et al. |
| 2009/0175697 A1 | | 7/2009 | Demarest et al. |
| 2010/0275753 A1 | | 11/2010 | Demarest et al. |

FOREIGN PATENT DOCUMENTS

| | | |
|---|---|---|
| DE | 32 38 964 | 4/1984 |
| DE | 40 07 831 | 9/1991 |
| EP | 0305632 | 3/1989 |
| EP | 0305799 | 3/1989 |
| EP | 607894 | 7/1994 |
| EP | 0668114 | 8/1995 |
| EP | 889146 | 1/1999 |
| EP | 0980729 | 2/2000 |
| FR | 1538481 | 9/1968 |
| FR | 2333870 | 1/1979 |
| FR | 2687946 | 9/1993 |
| GB | 969796 | 12/1961 |
| GB | 954348 | 4/1964 |
| GB | 1281117 | 7/1972 |
| GB | 1367980 | 9/1974 |
| GB | 1532851 | 11/1978 |
| GB | 2021632 | 12/1979 |
| GB | 2064400 | 6/1981 |
| GB | 2086291 | 5/1982 |
| GB | 2100284 | 12/1982 |
| GB | 2148758 | 6/1985 |
| GB | 2174945 A | 11/1986 |
| GB | 0812926 | 12/1997 |
| GB | 1170644 | 11/1999 |
| JP | 01-234126 | 8/1983 |
| JP | 58-132081 | 8/1983 |
| JP | 58-173022 | 10/1983 |
| RU | 1790638 | 1/1993 |
| SU | 716731 A | 2/1980 |
| SU | 1357161 | 12/1987 |
| SU | 1516263 | 10/1989 |
| SU | 1696197 | 7/1991 |
| WO | WO 98/56872 | 12/1998 |

OTHER PUBLICATIONS

"Das elektrochemisch bearbeitete Wertstuck-Oberflachen-qualitat und Genauigkeit", Nr. 1716:pp. 11-20 and 39-45.

Jones et al., *Improved Reformer Furnace Efficiency on Reformer Tube Metallurgy*, (1997).

Schmidt, et al., *Reformerrohre aus SchleuderguB*, pp. 151-156 (1992).

Mayer et al., *Mittellung der International Nickel Limited*, pp. 479-487 (1975).

Parks et al., *Hydrocarbon Processing*, pp. 53-56, 58, 60-61 (1996).

Hosoya et al., *Better furnace performance with new alloy radiant coil*, PTG:pp. 115-116, 119-121 (2001).

*Manoir Industries*, pp. 1-8, 23-35, 38-43 (1998).

"Tubular Products"; *Inco Alloys International*, pp. 1-9 (1994).

"Un Leader Mondial Dans le Developpement et la Production D'Alliagese a Huates Performances", *Inco Alloys International*, (2 pages unnumbered) and p. 19 (1992).

"Heat-Resistant Alloys for Hydrocarbon Processing", M.M.G.I., (3 pages unnumbered) and p. 42 (1991).

Livoti, *Letter referencing performance and operational conditions with Manaurite XM reforming tubes at our hydrogen reforming furnace over about 5-6 years in service*, 1-2 (1989).

Sharma, *Fertiliser News*: pp. 17-21 (1988).

Albano et al., *Energy Progress*, 8(3):pp. 160-168 (1988).

Van Grieken et al., "Experience with catalyst tubes, risers and manifold in primary reformers", *American Institute of Chemical Engineers*, (6 pages unnumbered) (1982).

"Petrochemical Products", *Fonderies et Acieries du Manoir*, (4 pages unnumbered) and p. 17.

"Materials for Steam Reformer Furnaces", (1 page unnumbered) (1971).

"Manaurite 36 XS", (4 pages unnumbered) (1970).

"Manaurite 36 XS", (4 pages unnumbered) (1967).

"Acieries de Pompey".

"Acieries du Manoir Pompey".

"Petrochemical", *Manoir Industries*, pp. 1-24.

"Tubes-Furnace Assemblies-Furnace Fittings".

WPI Abstract Accession No. 85-252041 and JP600165343 (Kubota), (1984).

WPI Abstract Accession No. 82-82187E and JP570134536 (Mitsubishi), (1981).

WPI Abstract Accession No. 77-53033Y and JP520070924 (Kubota), (1977).

Cox, John A., "Faraday's Law in the Factory", Anocut Engineering Company, Chicago, IL.

"The ECM Process", Anocut Engineering Company, Chicago, IL.

"Electrochemical Machining: a space-age way to refine forged, extruded and case shapes", Anocut Engineering Company, Chicago, IL (1969).

"Materials and Corrosion", *Carburization, Metal Dusting and Carbon Deposition*, pp. 221-225, and 328-335 (Apr./May 1998).

\* cited by examiner

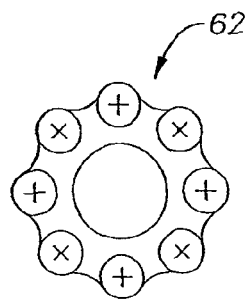 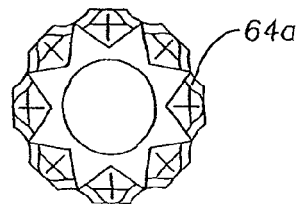 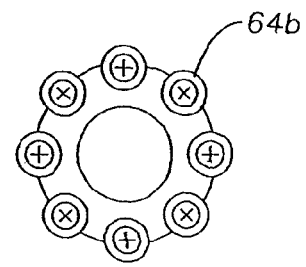
Fig. 5    Fig. 7    Fig. 9
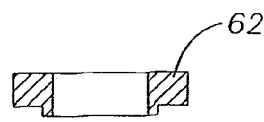 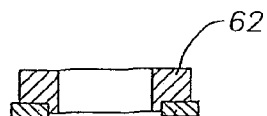 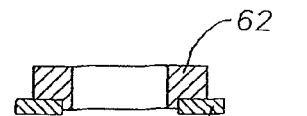
Fig. 6    Fig. 8    Fig. 10
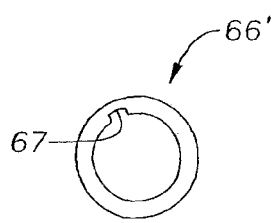 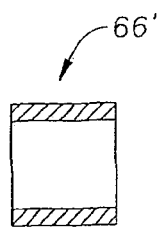 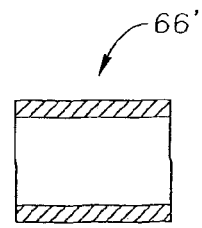
Fig. 12    Fig. 13    Fig. 14
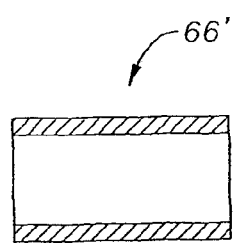 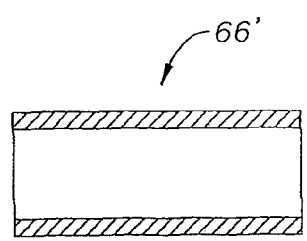
Fig. 15    Fig. 16

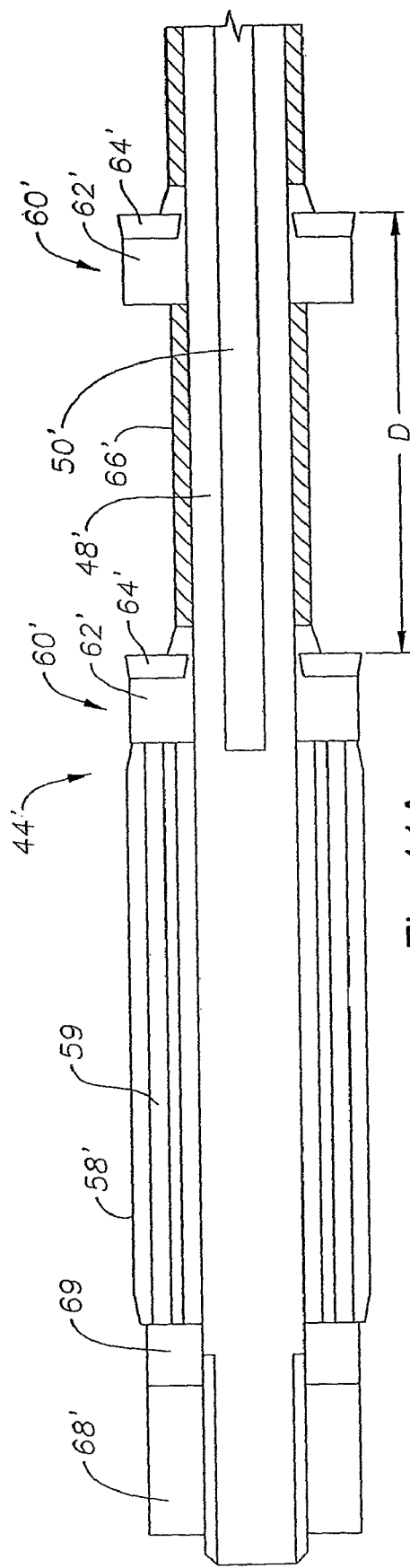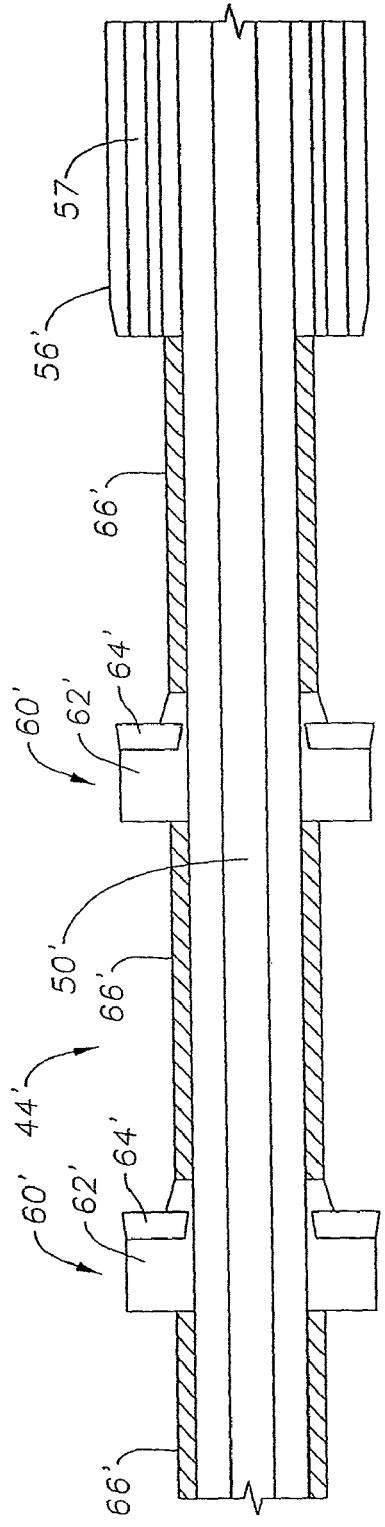
Fig. 11A
Fig. 11B

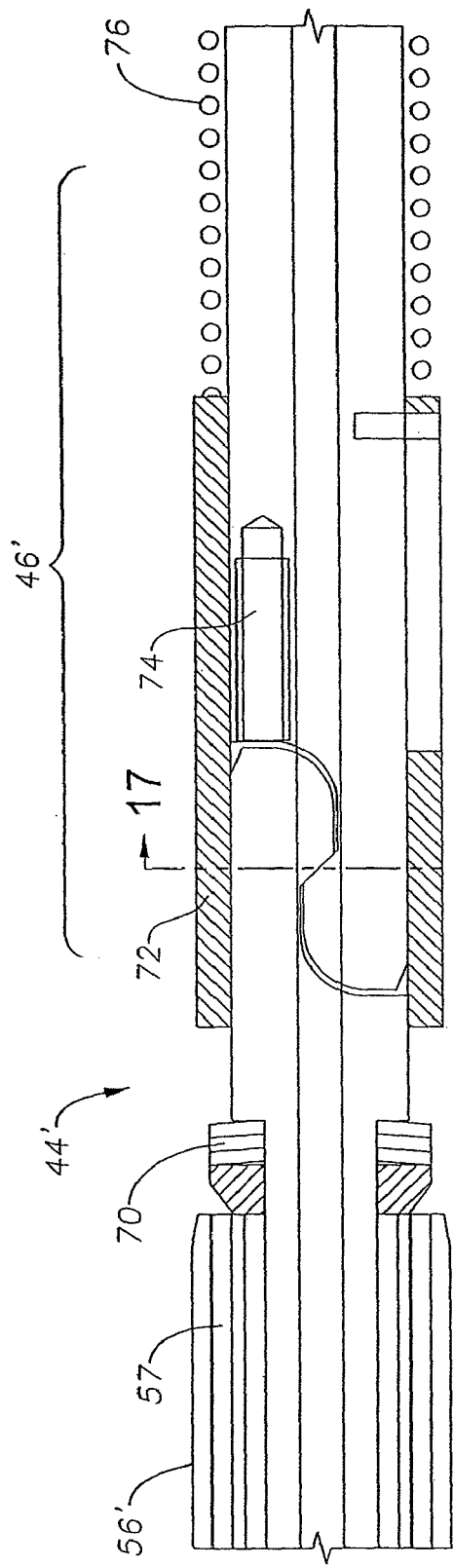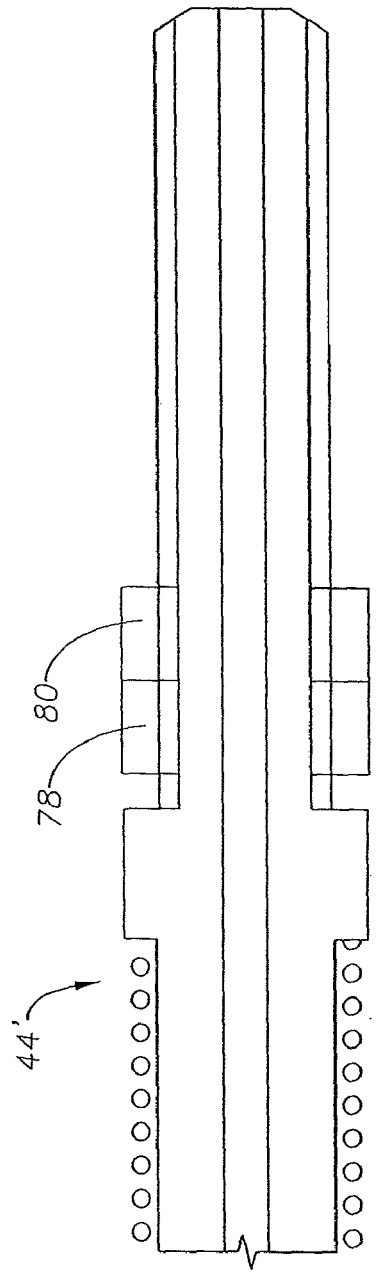

APPARATUS FOR MAKING CENTRIFUGALLY-CAST TUBE

BACKGROUND OF THE INVENTION

1. Field of the Invention

The present invention relates to furnace equipment for use in petrochemical plants, and more particularly, to improved centrifugally-cast tubes for use in such equipment and to a method and apparatus of making such tubes.

2. Description of the Related Art

It is well known that there are two basic types of furnaces used in petrochemical plants, one being "steam cracker" furnaces, and the other being "steam reformer" furnaces. Steam cracker furnaces are mainly used to make ethylene, and steam reformer furnaces are mainly used to make hydrogen. Both types of furnaces include a number of tubes, generally arranged vertically, that form a continuous flow path, or coil, through the furnace. The flow path or coil includes an inlet and an outlet. In both types of furnaces, a mixture of a hydrocarbon feedstock and steam are fed into the inlet and passed through the tubes. The tubes are exposed to extreme heat generated by burners within the furnace. As the feedstock/steam mixture is passed through the tubes at high temperatures the mixture is gradually broken down such that the resulting product exiting the outlet is ethylene in the case of a steam cracker furnace and hydrogen in the case of a steam reformer furnace.

The petrochemical industry has in the past recognized at least three desirable features in a steam cracker or steam reformer furnace. First, it is important to maximize the heat transfer rate from the furnace burners through the walls of the tubes and into the mixture of hydrocarbons and steam in order to increase the efficiency of the furnace. Second, it is important to make furnace tubes from materials that are resistant to what is known in the metallurgical arts as "creep". Third, it is important to make furnace tubes so as to be resistant to corrosion, carburization and metal dusting.

With regard to the second important feature, "creep" is basically the gradual elongation of a metal when placed under stress and subjected to high temperatures. Various creep-resistant alloys are known to those of skill in the art. Two main methods have developed within the industry of making furnace tubes with creep-resistant alloys, one being to extrude the tube, and the other being to centrifugally cast the tube. A centrifugally-cast tube is one formed by pouring an alloy in liquid form into a tubular mold that is rotating at a high speed. The alloy is allowed to cool so as to form the centrifugally-cast tube. The internal bore of the tube is then mechanically-machined by boring to achieve the desired inner diameter, resulting in a cylindrical tube having a circular cross section with a generally constant inner and outer diameter. The industry has discovered, however, that centrifugally-cast tubes exhibit superior creep properties in comparison to extruded tubes. In particular, upon inspecting cross-sections of extruded and centrifugally-cast tubes, the industry has discovered that extruded tubes have a very fine grain metallurgical structure, whereas centrifugally-cast tubes have much larger, and columnar, grains. Further, extruded tubes have a lower carbon content when compared to the carbon content of centrifugally-cast tubes. The larger, columnar grains and higher carbon content are what give the centrifugally-cast tubes superior creep properties in comparison to the fine grain microstructure and lower carbon content of extruded tubes.

One approach to achieving two of the above-identified objectives is disclosed in U.S. Pat. No. 6,250,340 ("the '340 patent"). In particular, the '340 patent discloses a method of modifying a centrifugally-cast tube by adding a series of longitudinally-disposed fins and valleys in the typically-circular internal bore of the tube. In this manner, the internal surface area of the tube is increased, thereby increasing the heat-transfer rate therethrough. As such, the '340 patent results in a tube that is resistant to creep (since it is centrifugally cast from a creep-resistant alloy) and has an increased heat transfer rate (by virtue of its modified internal profile). A key drawback to the tube disclosed in the '340 patent, however, is that it is not resistant to corrosion, carburization or metal dusting. This is because the tube in the '340 patent is made using an electrochemical machining (ECM) method, as opposed to a mechanical machining process (e.g., the boring process traditionally used to provide the desired diameter in a centrifugally-cast tube). As is known in the art, use of the ECM method results in an electropolished surface and does not provide adequate deformation and/or orientation of the subsurface or material lattice of the inner surface of the tube. In this regard, it is well known that an electropolished surface is not resistant to corrosion, carburization or metal dusting. See, e.g., MATERIALS AND CORROSION, *Carburization, Metal Dusting and Carbon Deposition*, ISSN 0947-5117, Vol. 49, No. 4/5, April/May 1998, pp. 221-225 and 328-335. These articles compare the effect of machining or any other surface deformation (e.g., grinding, blasting, peening, honing, etc.) to electropolishing and clearly show the advantage of conventional machining over electropolishing on resistance to carburization and metal dusting. An additional drawback to the ECM process is that it results in a tube having an interior surface with an inferior surface roughness and dimensional accuracy when compared to the interior surface that has been prepared by mechanical machining. A still further drawback to the ECM process is that it is more expensive relative to the cost of mechanical machining.

As such, there remains'a need in the art for a centrifugally-cast tube, and method and apparatus of making same, that (1) has an increased heat-transfer rate, (2) is resistant to creep, (3) is resistant to corrosion, carburization and metal dusting, (4) has a desirable surface roughness and dimensional accuracy, and (5) is cost-efficient. The present invention has been developed to overcome the foregoing deficiencies and meet the above-described needs.

SUMMARY OF THE INVENTION

In one aspect, the present invention may be a centrifugally-cast tube comprising: a tubular body made from a creep-resistant alloy, the body having an exterior surface and an interior surface, the interior surface including a plurality of bosses and a plurality of grooves, and the plurality of bosses and grooves being mechanically machined into the interior surface. Another feature of this aspect of the invention may be that the plurality of bosses and grooves are defined by a plurality of intersecting concave and convex radii. Another feature of this aspect of the invention may be that the plurality of bosses and grooves are formed by a broaching process. Another feature of this aspect of the invention may be that the interior surface is resistant to carburization and metal dusting. Another feature of this aspect of the invention may be that the surface roughness and dimensional accuracy of the interior surface is superior to that of a centrifugally-cast tube wherein the plurality of bosses and grooves are formed by a electro-chemical machining process. Another feature of this aspect of the invention may be that the plurality of bosses and grooves form a profile that is at least 5% longer than a circumference of a smallest circle that encompasses the entire resulting profile. Another feature of this aspect of the invention may be that the interior surface has a surface roughness of less than 125 RMS (CLA).

In another aspect, the present invention may include a method of improving a centrifugally-cast tube comprising: passing a first cutting tool having a plurality of first cutting inserts through a bore of the tube so as to mechanically remove a first quantity of material from the bore and to commence the formation of a plurality of grooves and bosses; passing a second cutting tool having at plurality of second cutting inserts through the bore so as to mechanically remove a second quantity of material from the bore and to continue the formation of the plurality of grooves and bosses, the plurality of second cutting inserts having dimensions different than corresponding dimensions of the plurality of first cutting inserts; and continuing to pass additional cutting tools having a plurality of additional cutting inserts through the bore so as to continue to mechanically remove additional quantities of material from the bore until a desired profile of grooves and bosses is achieved, each set of additional cutting tools having dimensions different than corresponding dimensions of the cutting inserts employed in the immediately preceding pass. Another feature of this aspect of the invention may be that the dimensions of each subsequent set of cutting tools are larger than the corresponding dimensions of the cutting tools employed in the immediately preceding pass. Another feature of this aspect of the invention may be that the dimensions incrementally increase at a rate of between 0.05 mm and 0.1 mm per pass.

In another aspect, the present invention may include a method of improving a centrifugally-cast tube comprising forming a plurality of grooves and bosses in an interior surface of the tube by mechanically deforming the interior surface. Another feature of this aspect of the invention may be that the plurality of grooves and bosses are gradually formed by passing a series of cutting tools having incrementally-differing dimensions over the interior surface.

In yet another aspect, the present invention may include an apparatus for improving a centrifugally-cast tube comprising: a first and a second guide adapted to hold the tube; a telescoping shaft adapted to pass longitudinally through a bore of the tube; and at least one cutting tool attached to the shaft and including a plurality of cutting inserts, the cutting tool being adapted to mechanically form a profile of grooves and bosses within the bore of the tube. Another feature of this aspect of the invention may be that the cutting inserts are indexable. Another feature of this aspect of the invention may be that the cutting inserts are provided with concave cutting surfaces. Another feature of this aspect of the invention may be that the cutting inserts are provided with convex cutting surfaces. Another feature of this aspect of the invention may be that the at least one cutting tool includes a plurality of cutting tools attached to the shaft, and further including at least one spacer collar disposed about the shaft and adapted to maintain the cutting tools in spaced relationship. Another feature of this aspect of the invention may be that the apparatus may further include means for lubricating the apparatus. Another feature of this aspect of the invention may be that the apparatus may further include means for attaching the at least one cutting tool to the shaft. Another feature of this aspect of the invention may be that the apparatus may further include means for attaching the at least one cutting tool to the shaft. Another feature of this aspect of the invention may be that the apparatus may further include at least one centering guide. Other features and aspects of the present invention will be explained below.

BRIEF DESCRIPTION OF THE DRAWINGS

FIG. 5 is a top view of a support ring of the present invention.

FIG. 6 is a side cross-sectional view of the support ring shown in FIG. 5.

FIG. 7 is a top view of a cutting tool of the present invention which includes a support ring with a plurality of concave cutting inserts attached thereto.

FIG. 8 is a side cross-sectional view of the cutting tool illustrated in FIG. 7.

FIG. 9 is a top view of a cutting tool of the present invention which includes a support ring with a plurality of convex cutting inserts attached thereto.

FIG. 10 is a side cross-sectional view of the cutting tool illustrated in FIG. 9.

FIG. 11 is side view, partially in cross-section, of another specific embodiment of a cutting assembly of the present invention.

FIG. 12 is an end view of a collar of the present invention.

FIG. 13 is a side view of a specific embodiment of a collar of the present invention.

FIG. 14 is a side view of a specific embodiment of a collar of the present invention.

FIG. 15 is a side view of a specific embodiment of a collar of the present invention.

FIG. 16 is a side view of a specific embodiment of a collar of the present invention.

While the invention will be described in connection with the preferred embodiments, it will be understood that it is not intended to limit the invention to those embodiments. On the contrary, it is intended to cover all alternatives, modifications, and equivalents as may be included within the spirit and scope of the invention as defined by the appended claims.

DETAILED DESCRIPTION OF THE INVENTION

Figure 1:
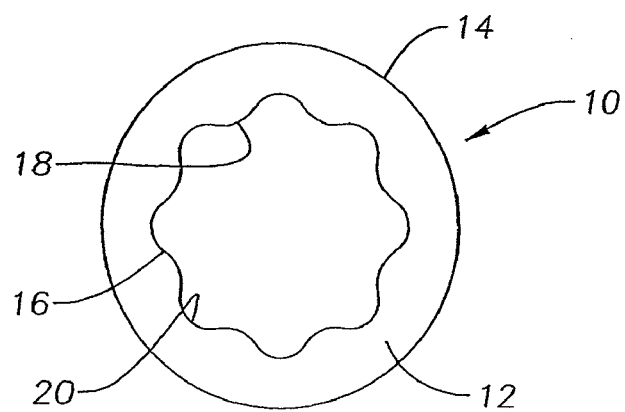
FIG. 1 illustrates a cross-sectional view of one embodiment of a centrifugally-cast tube of the present invention.
Figure 2:
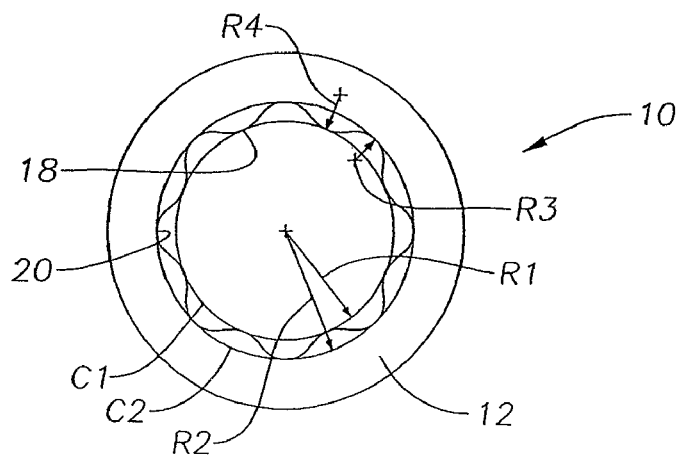
FIG. 2 is a cross-sectional view similar to FIG. 1, but illustrating certain dimensions of a specific embodiment of a tube of the present invention.

Referring to the drawings in detail, wherein like numerals denote identical elements throughout the several views, there is shown in FIG. 1 a specific embodiment of a centrifugally-cast tube 10 constructed in accordance with the present invention. In a specific embodiment, the tube 10 may include a body 12 made from a creep-resistant alloy, such as, for example, Manaurite 36X. The body 12 may include an exterior surface 14 and an interior surface 16. The interior surface 16 may include a plurality of bosses 18 and a plurality of grooves 20 disposed therebetween. While the specific embodiment shown in FIG. 1 illustrates a tube 10 having eight bosses 18 and eight grooves 20, those numbers should not be taken as a limitation, but, instead, the present invention covers any number of bosses 18 and grooves 20. In a specific embodiment, as shown in FIG. 2, the peaks of the bosses 18 may intersect a circle C1 having a radius R1. In a specific embodiment, the radius R1 may be 19 millimeters (mm). Similarly, the lowermost points of the grooves 20 may intersect a circle C2 having a radius R2. In a specific embodiment, the radius R2 may be 22.5 mm. In a specific embodiment, the radius R3 of each groove 20 may be 5 mm and the radius R4 of each boss 18 may be 5 mm. In a specific embodiment, the resulting profile results from the intersection, of a plurality of concave and convex radii at the bottom and top of the grooves 20 and comprises an integer number of grooves 20 and bosses 18. In a specific embodiment, the length of the resulting profile of the internal surface 16 is at least 5% longer than the circumference of the smallest circle that encompasses the entire resulting profile. In a specific embodiment, the depth of the grooves 20 may be in the range of from 3.5 mm to 6.35 mm, but larger and smaller depths are also encompassed by the present invention.

Each of the plurality of bosses 18 and grooves 20 is mechanically machined into the interior surface 16 so as to deform and orient the subsurface or material lattice of the interior surface 16 of the tube 10. As such, the result is a centrifugally-cast tube 10 that is resistant to corrosion, carburization and metal dusting. In addition, since the tube 10 is centrifugally cast, it is resistant to creep, and since the addition of the bosses 18 and grooves 20 result in an increased surface area of the interior surface 16 when compared to the interior surface of a tube of circular cross-section, the tube 10 also has an improved heat-transfer rate.

Figure 3:
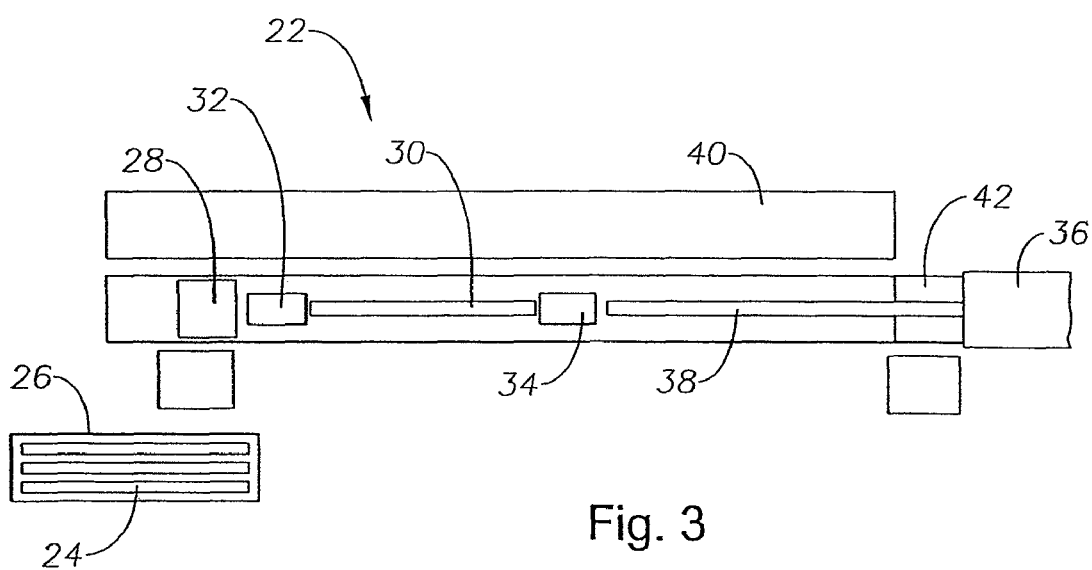
FIG. 3 is a schematic illustration of an apparatus of the present invention.

The present invention also includes a new method and apparatus of manufacturing the tube 10. A specific embodiment of an apparatus 22 of the present invention is shown schematically in FIG. 3. A plurality of tubes 24 that have been centrifugally cast are positioned on a platform 26 proximate the apparatus 22. The tubes 24 are of the centrifugally-cast type that have been traditionally formed by pouring an alloy in liquid form into a tubular mold that is rotating at a high speed. The alloy is allowed to cool so as to form the centrifugally-cast tube. The internal bore of the tube is then mechanically-machined by boring to achieve the desired inner diameter, resulting in a cylindrical tube having a circular cross section with a generally constant inner and outer diameter. In a specific embodiment, the inner diameter may be advantageously chosen equal to the diameter of the smallest circle that intersects the bosses 18. A crane 28 is used to lift and rotate a tube 30 from the platform 26 into position on the apparatus 22. The tube 30 is then aligned and secured between a first guide 32 and a second guide 34. The apparatus 22 also includes a broaching machine 36 that has a telescoping shaft 38 extending therefrom. In a specific embodiment the broaching machine 36 may be a Berthier model having a travel of 10 meters and a 50 KW power rating. The apparatus 22 may also include oil tanks 40 and 42 for providing lubrication to the broaching machine 36. In a specific embodiment, the lubricating oil may be of the type sold under the name "PERFOLUB 40" by Wynns, 92 Courbevoie, France. As will be described in more detail below, the present invention provides for a series of cutting tools to be mounted to the shaft 38 and then passed lengthwise through the tube 30. Numerous passes are contemplated with cutting tools of gradually increasing size so as to gradually shear away metal shavings from the interior surface 16 of the tube 30 until the profile illustrated, for example, in FIGS. 1 and 2 is achieved. The details of the cutting tools will now be explained.

Figure 4:
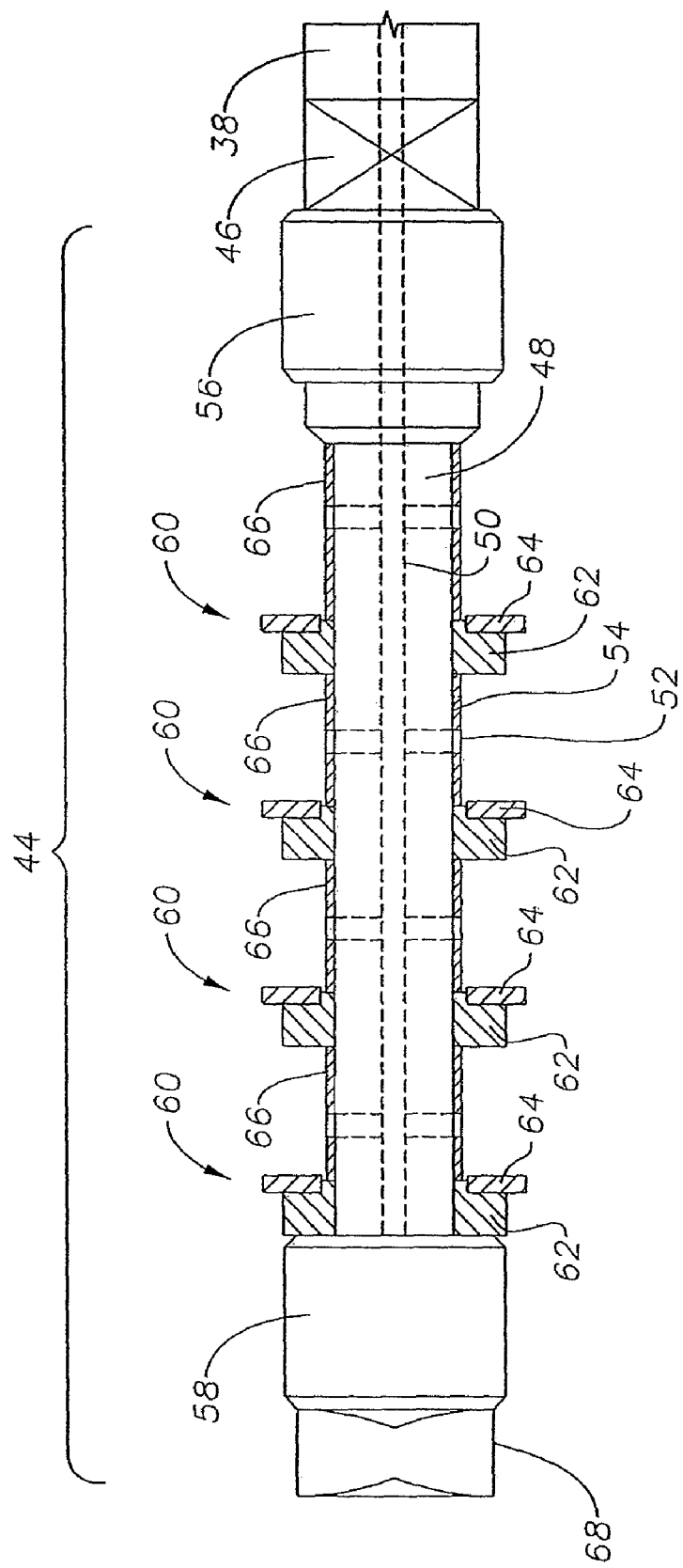
FIG. 4 is a longitudinal view in partial cross-section that illustrates a specific embodiment of a cutting assembly for use in making a tube of the present invention.

With reference to FIG. 4, a specific embodiment of a cutting assembly 44 is shown attached via an attachment mechanism 46 to the shaft 38 of the broaching machine 36. The cutting assembly 44 may include a shaft extension 48 having a central lubricating channel 50 disposed therein with a plurality of radial lubricating channels 52 leading therefrom to an outer surface 54 of the shaft extension 48. The lubricating channels 50 and 52 are in fluid communication with one or more of the oil tanks 40. The cutting assembly 44 may include a first centering guide 56 and a second centering guide 58 disposed at opposite ends of the shaft extension 48. The first centering guide 56 may be disposed adjacent the attachment mechanism 46. The cutting assembly 44 includes a plurality, of cutting tools 60 disposed about the shaft extension 48. The specific embodiment of the cutting assembly 44 shown in FIG. 4 includes four cutting tools 60, but the present invention is not limited to any particular number of cutting tools 60. Each cutting tool 60 includes a support ring 62 and a plurality of cutting inserts 64. In a specific embodiment, the cutting inserts 64 may be made of carbide and have a cutting radius of 5 mm, and may, for example, be of the type known as KX 15 sold by Safety, 92 Boulogne-Billancourt, France. The cutting inserts 64 may be connected to the support ring 62 in any known manner (e.g., by screws, etc.). In the specific embodiment shown in FIG. 4, the cutting tools 60 are disposed between the first and second centering guides 56 and 58, and are separated by spacer collars 66. As further discussed below, the spacer collars 66 may be provided in varying lengths to insure that metal shavings cut by the cutting inserts 64 are not allowed to damage the interior surface 16 of the tube 10. A locking nut 68 is threadably attached to the end of the shaft extension 48 to hold the centering guides 56, 58, cutting tools 60 and spacer collars 66 in place.

The cutting tools 60 are further illustrated in FIGS. 5-10. FIGS. 5 and 6 illustrate a support ring 62 without any cutting inserts 64 attached thereto. FIGS. 7 and 8 illustrate a support ring 62 with a plurality of concave cutting inserts 64a releasably connected thereto. The concave inserts 64a are used to form the bosses 18 in the tube 10. In a specific embodiment, the cutting radius of the concave inserts 64a may be 5 mm. A number of different support rings 62 are provided, each having a slightly different size. For example, the size of the support rings 62 may increase initially in 0.1 mm increments, and then, as the profile nears its final size, the size may increase in smaller increments, such as, for example, 0.05 mm. FIGS. 9 and 10 illustrate a support ring 62 with a plurality of convex cutting inserts 64b releasably connected thereto. The convex inserts 64b are used to form the grooves 20 in the tube 10. In a specific embodiment, the cutting radius of the convex inserts 64b may be 5 mm. The support rings 62 on which the convex inserts 64b are mounted (FIG. 7) are provided in gradually increasing sizes in the same manner as explained above for the concave inserts 64a. The support rings 62 are configured to hold eight cutting inserts 64, and may be used to create a tube 10 having the profile of eight bosses 18 and eight grooves 20 illustrated in FIG. 1. Again, however, that specific number is not a limitation of the present invention.

Figure 17:
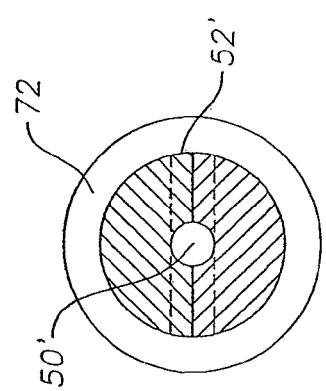
FIG. 17 is a cross-sectional view taken along line 17-17 of FIG. 11C, and illustrates a cross-section of a slide ring of the present invention.

Another specific embodiment of a cutting assembly 44' is shown in FIGS. 11A-11D. The cutting assembly 44' includes a first centering guide 56' and a second centering guide 58' disposed about a shaft extension 48'. In a specific embodiment, the centering guides 56' and 58' may include polytetrafluoroethylene (TEFLON) pads 57 and 59 to more precisely guide the cutting assembly 44' along the center of the tube 10 to which the desired profile is being applied. The shaft extension 48' may also include a central lubricating channel 50' and a plurality of radial lubricating channels 52' (see FIG. 17) that are in fluid communication with a source of oil (e.g., oil tanks 40 shown in FIG. 3). As shown in FIG. 11A, the cutting assembly 44' may include a locking nut 68' and a thrust washer 69. The cutting assembly 44' also includes a plurality of cutting tools 60'. Each cutting tool 60' may include a support ring 62' and a plurality of cutting inserts 64'. The cutting tools 60' may be separated by spacer collars 66'. FIG. 12 is an end view of a collar 66' and shows that the collars 66' are provided with a key way 67 adapted to cooperate with a corresponding keyway (discussed below) on the shaft extension 48'. FIGS. 13-16 are side views of various sizes of collars 66'. In a specific embodiment, the collar 66' in FIG. 13 may have a length of 20 mm, the collar 66' in FIG. 14 may have a length of 3.0 mm, the collar 66' in FIG. 15 may have a length of 40 mm, and the collar 66' in FIG. 16 may have a length of 55 mm. With reference to FIG. 11A, the distance D between leading edges of the cutting inserts 64' may be varied depending on the length of the spacer collars 66' that are employed. In a specific embodiment, the distance D may be 75 mm. The distance D should be sized so as to allow sufficient space in which metal shavings cut from the interior surface 16 of the tube 10 (see FIG. 1) may be temporarily housed without completely filling an annular space defined by the interior surface 16 of the tube 10, the collar 66' and the adjacent cutting tools 60' between which the collar 60' is disposed. This is important because the metal shavings or chips must be stored during the complete length (which may be greater than 3 meters) of the machining pass through the tube 10 by the cutting assembly 44/44' so as to avoid destroying or damaging the surface roughness of the profile being cut into the internal surface 16 of the tube 10.

As shown in FIG. 11C, the cutting assembly 44' may also include a compensation washer 70 that is adapted to compensate wear in the various components of the broaching machine 36. In a specific embodiment, the washer 70 may have a minimum rating of 4,000 daN. The attachment mechanism 46' of this embodiment may include a fast-clamp slide ring 72, a push spring 74, and a return spring 76. In operation, the slide ring 72 is shifted so as to compress the return spring 76. The push spring 74 is then compressed so as to separate the two conical bearing surfaces. The cutting assembly 44' may then be disengaged from the shaft 38. Another cutting assembly 44' having slightly larger cutting tools 60' may then be engaged by the opposite way. In service the push spring 74 maintains the two conical bearing surfaces in contact. The slide ring 72 is further illustrated in FIG. 17, which is a cross-sectional view taken along line 17-17 of FIG. 11C. As shown in FIG. 11D, this embodiment of the cutting assembly 44' may also include a nut 78 and locknut 80 for securing the cutting assembly 44' to the shaft 38 of the broaching machine 36 (see FIG. 3) and which are adapted to enable angular adjustment of the cutting assembly 44'.

Figure 19:
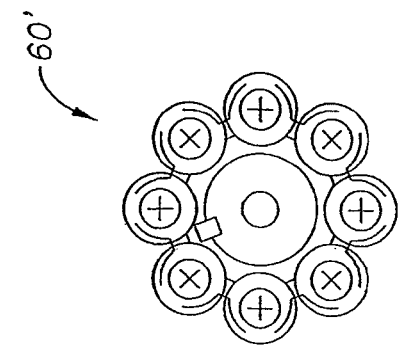
FIG. 19 illustrates a specific embodiment of a cutting tool of the present invention, and, in particular, illustrates a minimum diameter cutting tool that is used for cutting grooves in a tube of the present invention.
Figure 18:
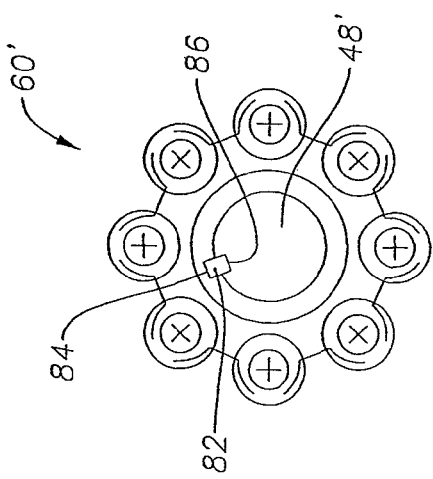
FIG. 18 illustrates a specific embodiment of a cutting tool of the present invention, and, in particular, illustrates a maximum diameter cutting tool that is used for cutting grooves in a tube of the present invention.
Figure 22:
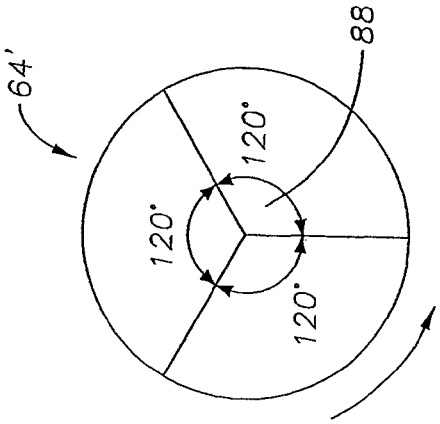
FIG. 22 is a top view of a cutting insert of the present invention and illustrates that the cutting insert can be indexable to maximize the useful life of the cutting insert.
Figure 21:
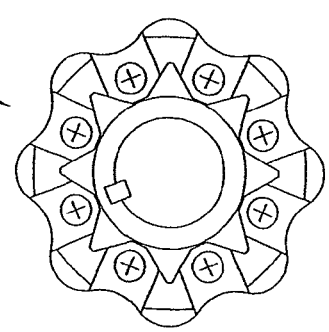
FIG. 21 illustrates a specific embodiment of a cutting tool of the present invention, and, in particular, illustrates a maximum diameter cutting tool that is used for cutting bosses in a tube of the present invention.
Figure 20:
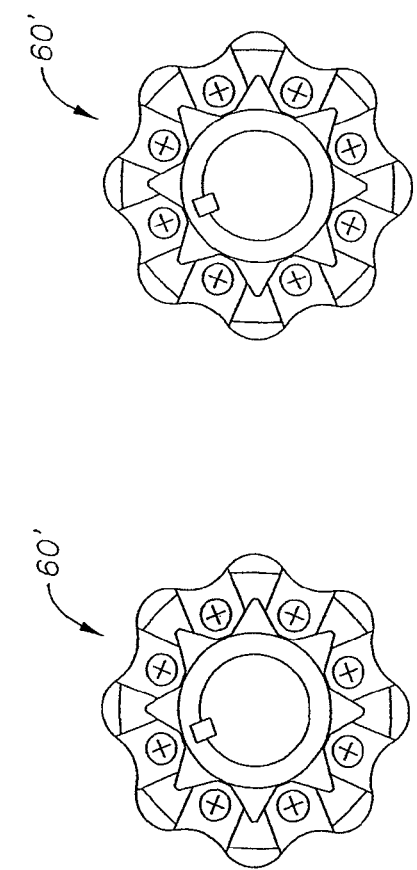
FIG. 20 illustrates a specific embodiment of a cutting tool of the present invention, and, in particular, illustrates a minimum diameter cutting tool that is used for cutting bosses in a tube of the present invention.

FIGS. 18-21 illustrate specific embodiments of cutting tools 60' of the present invention. FIG. 18 illustrates a maximum diameter cutting tool 60' that is used for cutting the grooves 20 in the tube 10 (see FIG. 1). FIG. 19 illustrates a minimum diameter cutting tool 60' that is used for cutting the grooves 20 in the tube 10 (see FIG. 1). FIG. 20 illustrates a minimum diameter cutting tool 60' that is used for cutting the bosses 18 in the tube 10 (see FIG. 1). FIG. 21 illustrates a maximum diameter cutting tool 60' that is used for cutting the bosses 18 in the tube 10 (see FIG. 1). As explained above, the present invention contemplates numerous different sizes of support rings 62 with only minor incremental size differences between the various support rings 62. FIGS. 18-21 further show that this embodiment may include indexing keys 82 adapted to cooperatively engage corresponding keyways 84 and 86 in the cutting tools 60' and shaft extension 48', respectively. As shown in FIG. 22, in a specific embodiment, the cutting inserts 64' may be indexable so as to maximize the useful life of each insert. Each insert 64' can be releasably attached to the cutting tool 60' by a screw 84. When a section of the insert 64' becomes worn, instead of discarding the insert 64', the screw 84 can be loosened, the insert can be rotated 120 degrees so that an unused section of the insert 64' is positioned for cutting, and the screw 84 can then be re-tightened to lock the insert 64' in place. In a specific embodiment of the invention, it has been learned that a single 120-degree section of an insert 64' becomes worn and no longer useful after about 30 passes. As such, if it is rotated three times, a single insert 64' may be used for up to 90 cutting passes through the tube 10.

Referring back to FIG. 3, the manner in which a desired profile is formed in the internal surface 16 of the tube 10 will now be described. First, a centrifugally-cast tube 30 is made in the traditional manner as discussed above and placed into position between the first and second guides 32 and 34. A cutting assembly (such as cutting assembly 44 or 44') is connected (such as by attachment mechanism 46 or 46') to the shaft 38 of the broaching machine 36. For the first pass of the cutting assembly 44/44' through the tube 30, the cutting tools 60/60' are each equipped with a convex cutting insert 64/64' on a support ring 62 having a minimum radius. During this first pass, an initial cut is made at a depth of, for example, 0.1 mm. In this manner, the formation of the grooves 18 has commenced. After this first pass, the broaching shaft 38 is then retracted and the first cutting assembly is replaced with another cutting assembly that is equipped with convex inserts on a support ring 62 having a slightly larger radius. For example, the radius may be increased by 0.05 mm or 0.1 mm. This process is repeated until the desired groove depth is achieved. Next, the same process is repeated with concave cutting inserts and numerous passes are made, each pass being made with a support ring 62 having a slightly larger radius, until the desired profile for the bosses 18 is achieved. In a specific embodiment, each cutting assembly 44/44' may be provided with four cutting tools 60/60' of slightly different sizes, each successive one having, for example, a difference in machined depth of 0.1 mm. In this manner, a total cut of 0.4 mm would be made in a single pass.

In a specific embodiment, each "roughing" pass made at a depth of 0.1 mm may be made at a speed of 12 meters/minute, and each "finishing" pass made at a depth of 0.05 mm may be made at a speed of 18 meters/minute. As explained above, as the final size of the profile is approached, the size of the incremental increases in the sizes of the support rings 62 may be lowered, for example, to less than 0.05 mm, in order to achieve a more desirable surface roughness and dimensional accuracy, and thereby result in a tube having a greater resistance to carburization and metal dusting. In actual testing, a tube of the present invention has been achieved wherein the internal surface 16 has a surface roughness of 0.8 Ra µm, which equates to 32 RMS (CLA). "RMS" means Root Mean Square and in micro inch is a United States unit for surface roughness. "CLA" means Center Line Average and in micro inch is a United Kingdom unit for surface roughness. "Ra" in micrometer is a European unit for surface roughness. The surface roughness of 32 RMS (CLA) achieved by the present invention is far superior to the surface finish of 130 RMS (CLA) reported in the '340 patent, and also to a surface roughness of 125 RMS (CLA), which is the usual surface roughness targeted in connection with finned tubes.

From the above description it should now be apparent that the present invention has a number of advantages. Use of the method and apparatus of the present invention results in a centrifugally-cast tube having a macrostructure with a large grain size and high creep properties. In addition, subsurface deformation and orientation is achieved by the cutting passes of the hard metal (carbide) cutting inserts over the interior surface. Deformation of the primary carbides in the lattice at the interior tube surface can even be observed at high magnification.

It is to be understood that the invention is not limited to the exact details of construction, operation, exact materials or embodiments shown and described, as obvious modifications and equivalents will be apparent to one skilled in the art. For example, while the term "tube" has been used to describe the present invention, it should be understood that the present invention applies equally to any conduit of any cross-sectional geometry (e.g, square, rectangular, etc.), and is not limited to a tube of circular cross-section. In addition, while the tube 10 and related method and apparatus 22 has been illustrated and discussed in the context of a particular geometric profile (e.g, bosses 18 and grooves 20 having semi-circular profiles), the present invention is intended to cover bosses and grooves of any geometric or other profile, and is not intended to be limited to semi-circular profiles. In addition, while the present invention has been illustrated in the context of grooves and bosses that are aligned with the longitudinal axis of the tube, the present invention is also intended to cover tubes and the related method and apparatus in which the grooves and bosses are formed in a spiral or helical pattern within the tube. This may be achieved by the present invention by rotating the cutting assemblies 44 at a constant rate as they are being passed through the tube. Further, while the present invention has been explained in the context of steam reformer furnaces and steam cracker furnaces, the present invention may also be useful in other applications. For example, the present invention may be applied to heaters used in DRI (Direct Reduction of Iron) plants, which is a main area where metal dusting is observed. Accordingly, the invention is therefore to be limited only by the scope of the appended claims.

The invention claimed is:

1. An apparatus for improving a centrifugally-cast tube comprising:
   a first and second guide adapted to hold the tube;
   a shaft adapted to pass longitudinally through a bore of the tube;
   one or more convex assemblies of cutting tools mountable on the shaft and including only a plurality of cutting inserts with a convex profile for forming grooves, the one or more convex assemblies comprising successive convex cutting tools, successive in the longitudinal direction of the shaft, of increasing dimensions that are adapted to mechanically form a profile of grooves within the bore of the tube; and
   one or more concave assemblies of cutting tools mountable on the shaft as an alternative to the one or more convex assemblies of cutting tools and including only a plurality of cutting inserts with a concave profile for forming bosses, the one or more concave assemblies comprising successive concave cutting tools, successive in the longitudinal direction of the shaft, of increasing dimensions that are adapted to mechanically form a profile of bosses within the bore of the tube.

2. The apparatus of claim 1, wherein the cutting inserts are indexable.

3. The apparatus of claim 1, wherein the one or more convex assemblies and the one or more concave assemblies further comprise at least one spacer collar disposed about the shaft and adapted to maintain the cutting tools in spaced relationship.

4. The apparatus of claim 1, further including means for lubricating the apparatus.

5. The apparatus of claim 1, further including means for attaching the cutting tools to the shaft.

6. The apparatus of claim 1, further including at least one centering guide.

7. The apparatus according to claim 1, wherein the cutting tools each comprise a supporting ring mounted on the shaft and the cutting inserts are attached to the supporting ring, the respective supporting rings of successive cutting tools having increasing sizes.

8. The apparatus according to claim 7, wherein the successive supporting rings along the shaft increase in size in 0.1 mm increments or 0.05 mm increments.

9. The apparatus according to claim 8, wherein the cutting inserts are releasably connectable to the supporting rings.

10. The apparatus according to claim 9, wherein the cutting inserts each comprise a disk with a peripheral cutting edge, each of the cutting inserts being rotatable so that when a section of the peripheral cutting edge is worn, an unused section of the peripheral cutting edge is positioned for cutting.

11. The apparatus according to claim 1, wherein a distance D between two leading edges of the consecutive cutting inserts is 75 mm.

12. An apparatus for improving a centrifugally-cast tube with a length greater than 3 meters comprising:
   a first and second guide adapted to hold the tube;
   a shaft adapted to pass longitudinally through a bore of the tube,
   at least two consecutive cutting tools attached to the shaft and each including a plurality of cutting inserts, the cutting tools being adapted to mechanically form a profile of grooves or bosses within the bore of the tube, and
   a spacer collar disposed between each of two consecutive ones of the cutting tools and mounted on the shaft, separating leading edges of the two consecutive cutting inserts by a distance D, the collar being sized to provide an annular space defined by the interior surface of the tube, the collar, and the adjacent cutting tools, to house metal shavings cut from an interior surface of the tube without damaging a surface roughness of a profile being cut in the interior surface of the tube during a complete length of a machining pass through the tube,
   wherein the cutting tools each comprise a supporting ring mounted on the shaft and the cutting inserts are attached to the supporting ring, the respective supporting rings of successive cutting tools having increasing sizes.

13. The apparatus according to claim 12, wherein each collar has a length of 20 mm, 30 mm, 40 mm or 55 mm.

14. The apparatus according to claim 12, wherein the cutting tools each comprise only convex or only concave cutting inserts.

15. The apparatus according to claim 12, wherein the successive supporting rings along the shaft increase in size in 0.1 mm increments or 0.05 mm increments.

16. The apparatus according to claim 15, wherein the cutting inserts each comprise a disk with a peripheral cutting edge, each of the cutting inserts being rotatable so that when a section of the peripheral cutting edge is worn, an unused section of the peripheral cutting edge is positioned for cutting.

17. The apparatus according to claim 12, wherein the cutting inserts are releasably connectable to the supporting rings.

18. The apparatus according to claim 12, wherein a distance D between two leading edges of the consecutive cutting inserts is 75 mm.

\* \* \* \* \*